Aug. 18, 1942.         W. E. SCHWANHAUSSER         2,293,408
                   AUTOMATIC EXHIBITION MECHANISM
                         Filed Nov. 13, 1940        4 Sheets-Sheet 1

INVENTOR.
WALTER E. SCHWANHAUSSER
BY
ATTORNEY.

Aug. 18, 1942.　　W. E. SCHWANHAUSSER　　2,293,408
AUTOMATIC EXHIBITION MECHANISM
Filed Nov. 13, 1940　　　4 Sheets-Sheet 4

INVENTOR.
WALTER E. SCHWANHAUSSER
BY
ATTORNEY

Patented Aug. 18, 1942

2,293,408

UNITED STATES PATENT OFFICE 2,293,408

AUTOMATIC EXHIBITION MECHANISM

Walter E. Schwanhausser, Maplewood, N. J., assignor to Charles Beseler Company, New York, N. Y., a corporation of New Jersey Application November 13, 1940, Serial No. 365,443

10 Claims. (Cl. 88—28)

The invention relates to stereopticon devices of the nature wherein a plurality of slides or like members are successively presented automatically for projection or exhibition, as from a carrier or magazine common to all of the members. The slides may be of the usual transparency type, either black and white or in color, or of the opaque type wherein the exhibition is accomplished by reflection.

The invention has for an object to simplify the operation of apparatus of this nature, more especially in connection with the loading of the magazine or carrier for a plurality of exhibits.

A further object of the invention is to provide a construction of carrier means which, while the slide-holding element thereof is designed to retain a maximum number of slides or the like, can nevertheless operate satisfactorily with a lesser number without the usual undue delay inherent in the types heretofore utilized when not fully loaded, and operating to repeat continuously a particular program.

A still further object of the invention is to provide means for cutting out or skipping any desired slide or slides of a group and still carried, so that such selected slide will not be presented for projection; also to allow of loading a magazine with less than the full complement of slides.

Another object of the invention is to provide a novel form of holder or magazine for the individual slides whereby exchange of a group thereof is facilitated, as by replacing a magazine unit with a different one, as well as through replacement of individual slides.

Still another object is to simplify the associated mechanism for rocking a slide from and returning the same to inoperative position on the magazine or carrier.

In carrying out the invention, means are provided to locate automatically and in succession in proper position before projecting apparatus a number of slide-retaining elements with corresponding slide, each slide being presented thus for a predetermined time interval. These retaining elements to this end are pivotally supported on a rotatable carrier mechanism which, in accordance with the invention, comprises separable elements—one constituting a continuously driven support bearing also operating means for effecting the rocking of a slide from the carrier mechanism and its return to inoperative position, and the other element a slide carrier or magazine which rests merely upon the said support and is carried along thereby due solely to the friction of the respective contacting surfaces. The arrangement is such that the support rotates at one side of the projection portion of the apparatus and the slide carrier or magazine normally coaxially with the said support.

Slide holders are pivotally supported circumferentially by the magazine, and provision is made as in removable stops or pins, one for each slide holder, projecting radially from the circumference of the magazine, to hold temporarily a holder in position to be brought into location for projection; the magazine being maintained stationary during this period while the support continues its rotation.

The said support carries the actuating means for swinging a positioned holder in a projection location, for definitely fixing or centering optically the swung holder in its location and for releasing the magazine; also for operating shutter mechanism of the projecting apparatus. By removing a particular pin or stop element from the magazine, the corresponding slide holder will not come into action as the magazine is brought around by the continuously rotating support.

A magazine is readily removable by merely lifting the same off the rotatable support, and exchange and loading are thereby greatly facilitated; also, individual slide holders are readily replaceable.

The nature of the invention, however, will best be understood when described in connection with the accompanying drawings, in which.

Figure 1:
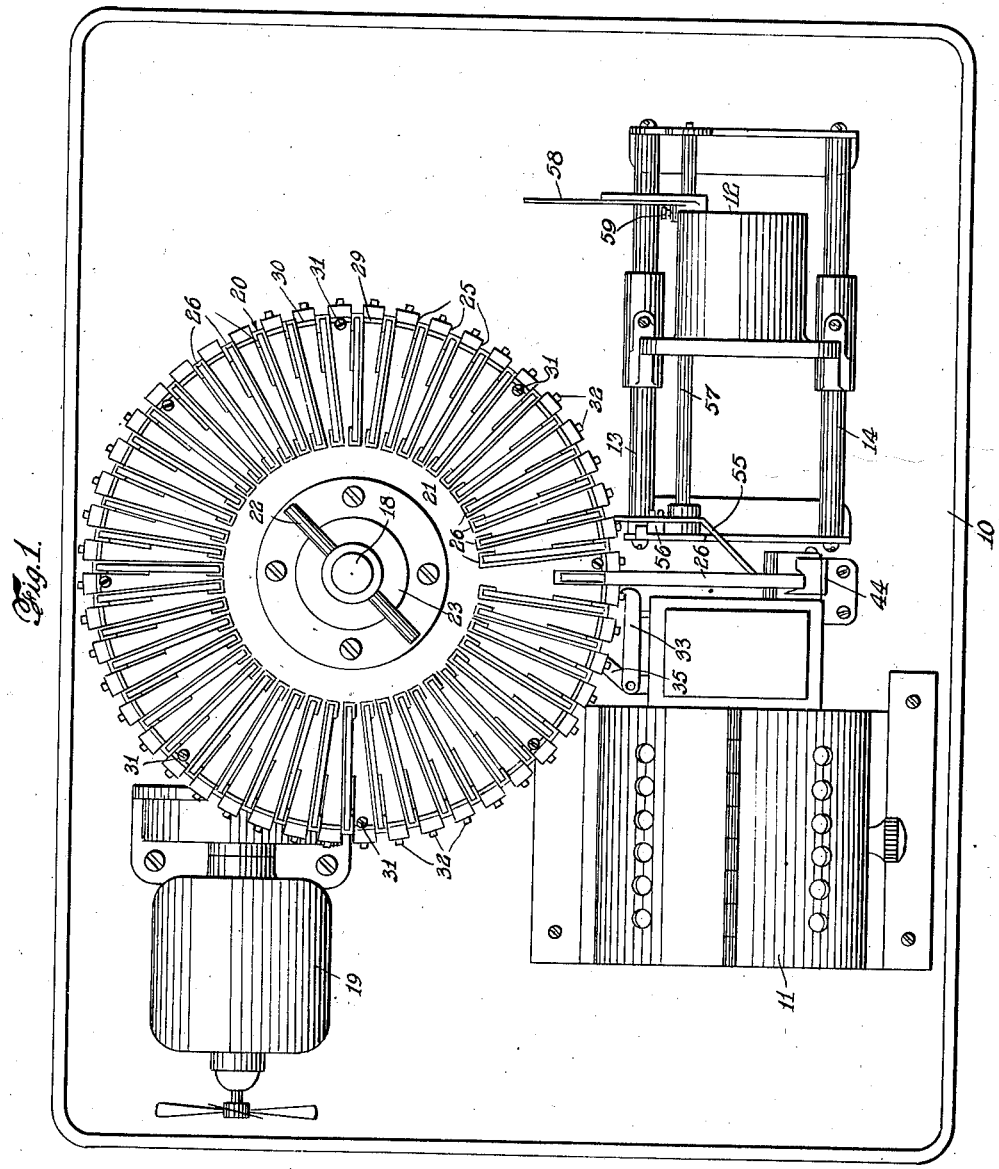
Fig. 1 is a plan view of the novel projection mechanism with a slide holder swung into projection location.
Figure 2:
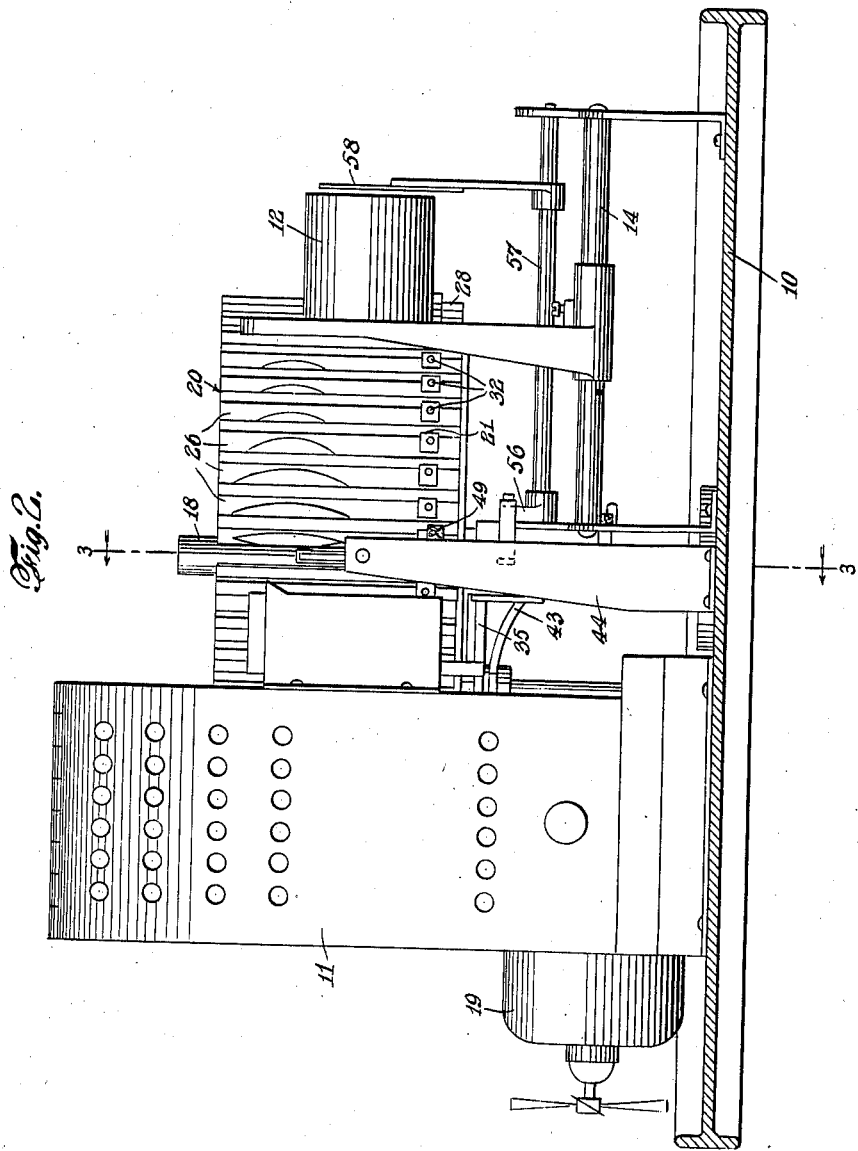
Fig. 2 is a side elevation thereof.

Referring to the drawings, 10 designates a base or suitable support for both the projection portion of the automatic exhibition mechanism and the slide-retaining means, as well as the actuating means whereby slides are successively presented from the retaining means to the said projection portion and after a predetermined interval of projection withdrawn and returned to the retaining means. The said projection means may be any well known apparatus, or apparatus of special design, including generally a lamp house 11 and projection lens 12 with intermediate clear space to accommodate a slide frame or holder with slide, and designed for projecting the matter depicted on a transparency or reflecting the same from an opaque slide—all of which is well known and forms no particular part of the present invention. Lens 12 is adjustable toward and away from the lamp house 11 along the rods 13 and 14 upon which it is slidably mounted.

Figure 3:
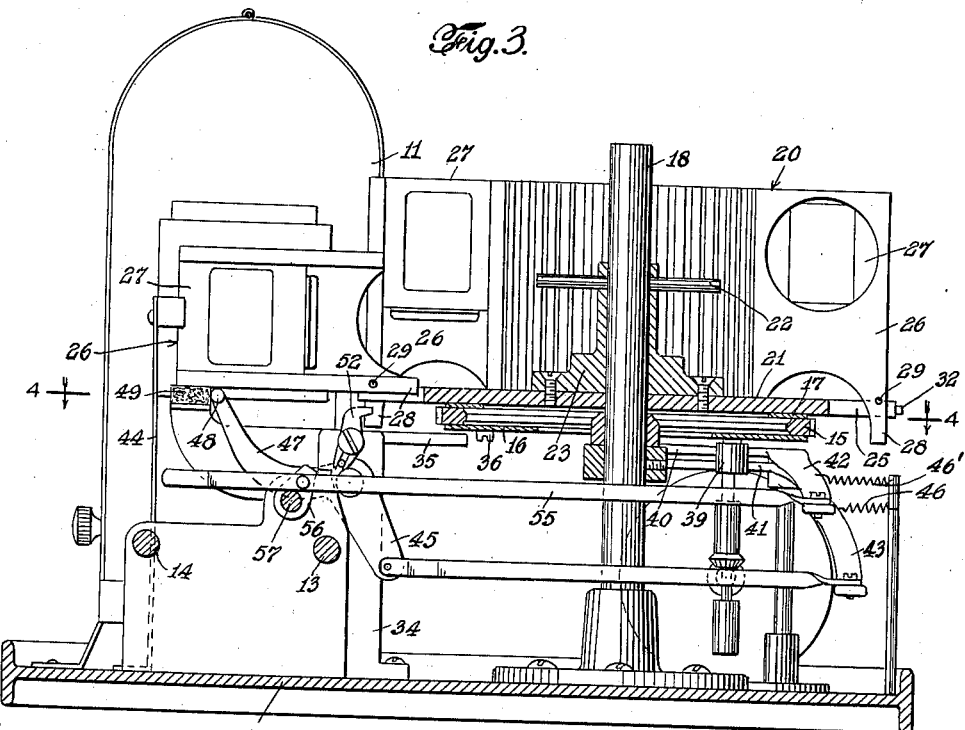
Fig. 3 is a vertical section through the mechanism, taken on the line 3—3, Fig. 2, and looking in the direction of the arrows.
Figure 4:
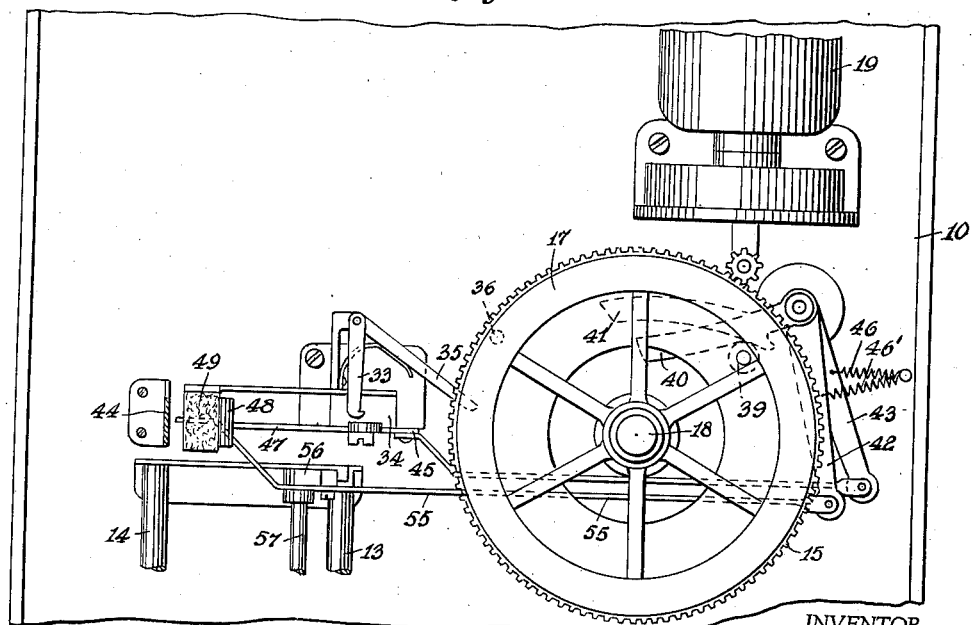
Fig. 4 is a horizontal section taken on the line 4—4, Fig. 3, looking in the direction of the arrows and with the slide holder magazine removed.
Figure 5:
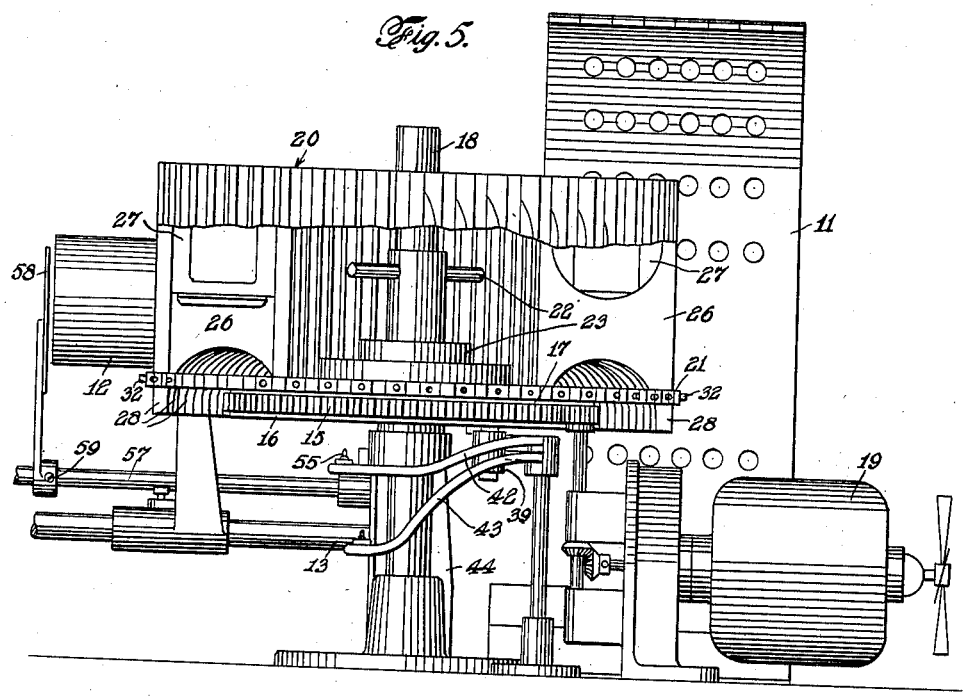
Fig. 5 is a side elevation, opposite to that shown in Fig. 2, with a portion of the slide holders broken away.
Figure 6:
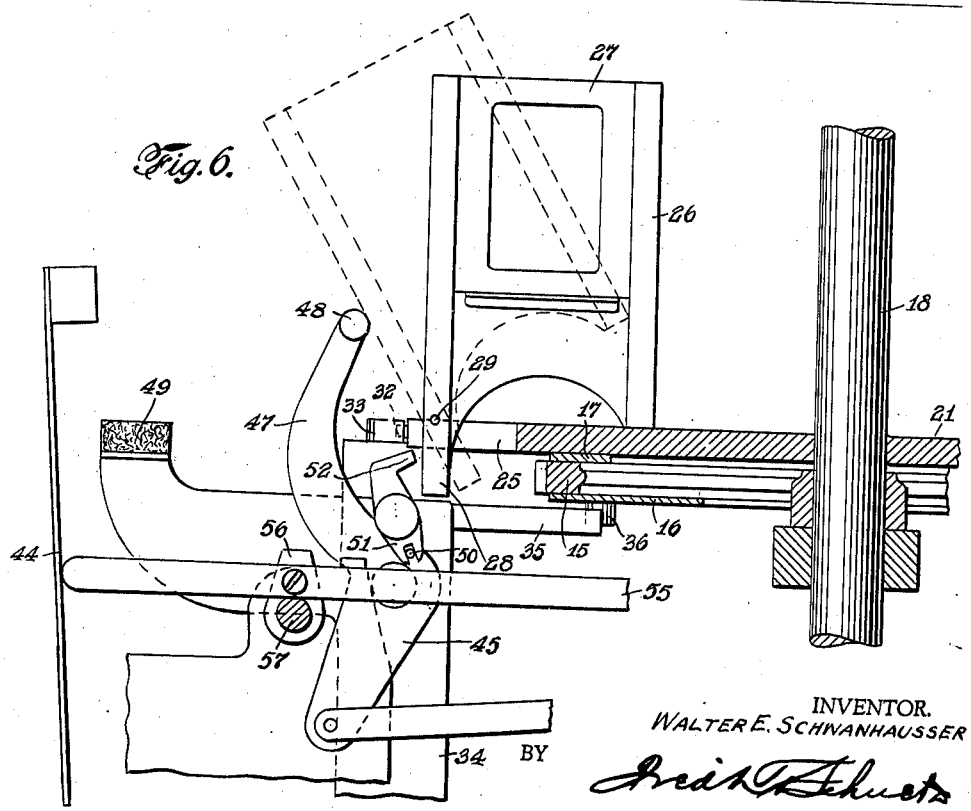
Fig. 6 is an enlarged fragmentary view, with magazine support shown in section, illustrating the operation of the actuating mechanism.

The novel apparatus is concerned more especially with the associated magazine for a plurality of the slide frames or holders and with the manner of providing them in position in the projection means for display thereby of the matter depicted on a slide carried by a holder. Contrary to the usual practice, while provision is made to move or rotate the magazine with respect to the projection means to advance the holders consecutively, such magazine is not an integral part of the rotation mechanism but is constituted as a separable element. Thus, as indicated more clearly in Figs. 3 and 6 of the drawings, a continuously rotatable support is provided at one side of the projection means and may consist, for example, of the gear wheel 15 with lower ring 16 and upper ring 17 secured thereto for rotation therewith. This support is mounted over a spindle 18 extending upwardly from base 19, the gear wheel 15 being designed to be driven continuously while the apparatus is in operation from a suitable source of power, as the electric motor 19, through intermediate mechanism.

Also mounted over the said spindle 18 for free rotation is the magazine 20 for the slide holders; and the same may comprise a circular disk 21 resting upon the upper ring 17 to be carried around with the support through friction between the two contacting surfaces, the support, however, being free to rotate relatively to the disk and the magazine being bodily removable from said support. A finger piece 22 extending radially from a hub 23 attached to the said disk may serve as a convenient means in effecting such removal.

The disk 21 is provided about its circumference with radial slots 25 directed inwardly from the circumference and in which are pivotally mounted, respectively, a plurality of slide holders 26 for the slides 27 carrying the matter to be exhibited. Such holder may comprise a channeled rectangular frame open at the outer end and having also an arm 28 at the opposite end whereby to mount tiltably a frame in a slot to assemble the various frames on the disk 21 as a magazine for slides. The different arms 28 may conveniently be pivotally secured in the said slots by perforating said arms and passing therethrough a stiff wire 29 set in a circular interrupted groove 30 provided in the top surface of disk 21 and held thereto, after the holders have been assembled on said wire, by screws 31 fitting into the disk. In their normal position, the holders or frames 26 assume a vertical position being swung inwardly with part of one end resting upon the upper surface of the disk 21, as shown in the full line position, Fig. 6, a said holder, however, being adapted to be swung into a substantially horizontal position, as indicated in the broken line position, Fig. 6 of the drawings, into the optical axis of the projection means, as will hereinafter be more fully set forth.

Between the various slots 25 and extending radially outwardly from the periphery of disk 21 are arranged removable stop members 32 such as pins or screws which may be inserted or removed to bring, respectively, a frame or holder into action or to render the same for the time being inoperative, i. e. cause it to remain in its vertical position on disk 21 by failure of the disk to be stopped in its rotation at the point corresponding to the particular holder. In other words, the disk will continue to rotate with its support 15—16—17 until a succeeding pin 32 engages a spring-urged catch 33 pivoted to a post 34 extending upwardly from the base. This catch is part of a bell-crank whose opposite arm 35 extends below the support for disk 21 into the path of movement of a pin or stud 36 projecting downwardly from the surface of ring 16 and rotatable therewith to engage the arm 35 to rock the bell-crank and release momentarily a stop member. The disk 21 may then continue to rotate with its support until a succeeding stop pin is engaged by the catch 33 to arrest temporarily its rotational movement.

It is during these intervals of non-rotation of disk 21 that a holder 26 is to be tipped over into the horizontal exposure position and present its slide for exhibition by the projection means. To accomplish this and to effect its return again to the upright position on disk 21, a roller member 39 is provided on the under side of the support to rotate with the said support and to engage periodically two cam elements 40 and 41. These are provided on the arms of bell-cranks 42 and 43, respectively, whose other arms are adapted respectively for operating a spring element 44 extending upwardly from the base designed for centering optically a holder with slide positioned for exposure and for rocking the one arm 45 of a further bell-crank pivoted to post 34. Arm 45 through arm 43 is biased by means of a spring 46 to force the other arm 47 of the said bell-crank away from the disk 21 and bears at its outer end a roller 48 for engaging the side of a holder to return the same to the inoperative location on disk 21. A spring 46' biases the arm 42.

It will be understood, of course, that these cam elements are so constructed and located that the desired sequence of operations is attained, that is to say, element 44 will be forced in a direction away from the disk to allow the holder to tilt over to rest eventually on a cushioned stop 49 and will then be released to center said holder. Arm 47 in the meantime also moves in a direction away from the disk under the influence of spring 46 and at the same time a further lever is actuated by a pin 50 on arm 47 fitting the one and bifurcated arm 51 of the said further lever whose other arm terminates in a nose 52. The latter is designed for engagement with arm 28 of a slide holder, the action being to tip over a holder as arm 47 moves outwardly; and when the exhibition interval has terminated, said nose will be withdrawn and the holder returned under an impulse imparted thereto from said arm 47 as spring 46 becomes effective upon freeing of arm 43 from the action of cam element 41.

The catch 33 will then release the stop pin for the particular holder whose slide has been exhibited, and the cycle will be repeated when the rotation of disk 21 is again arrested upon engagement with said catch of a succeeding pin extending radially therefrom.

Shutter mechanism may also be provided, if desired, to cut off the light beam from the projection lens 12 during the interval of change from one slide to the next. For example, the operating element 55 from bell-crank 42 is connected by the rocker arm 56 to a horizontally disposed rock shaft 57. The latter carries then the shutter 58 which is slidable along said shaft for adjustment in the event of a change in the projection lens position. The adjustment is readily effected by means of a set screw 59 passing through the hub of the shutter arm. It will be noted that the end of element 55 actuating the shutter and the arm or spring element 44 is not attached to said arm but is displaced a slight distance away from the same in its inoperative position, thereby providing for a slight lag so that the shutter will be positioned to cut off the beam of light prior to any change in the status of the exhibit.

I claim:

1. In projection mechanism for consecutively exhibiting matter depicted on a plurality of slides: the combination with fixed projection means; of a revolvable member affording an assemblage of independent slide holders associated with the projection means and including a continuously rotatable support, a slide carrier resting thereon and rotated thereby through the frictional contact therebetween, the slide holders being pivotally supported on the carrier, removable elements projecting from the carrier and corresponding in number to the respective holders, together with fixedly located means adapted for releasable engagement with a removable element for interrupting the rotation of said carrier in the selection of a holder, and means movable with the rotatable support for releasing the said engagement.

2. In projection mechanism for consecutively exhibiting matter depicted on a plurality of slides: the combination with fixed projection means; of a revolvable member affording an assemblage of independent slide holders associated with the projection means, removable elements projecting from the member and corresponding in number to the respective holders, together with fixedly located means adapted for releasable engagement with a removable element for interrupting the rotation of said member in the selection of a holder, and means movable with the said revolvable member for releasing the said engagement, additional fixedly located means for engaging a selected holder to swing the same into operative position and to return said holder to the inoperative position, and to center the holder with reference to the projection means, and actuating means movable with the revolvable member for controlling the action of said additional fixedly located means.

3. In projection mechanism for consecutively exhibiting matter depicted on a plurality of slides and including means for projecting a light beam through a selected slide and a shutter for intercepting the light beam projected by the said means: of a revolvable member affording an assemblage of independent tiltable slide holders associated with the projection means, removable elements projecting from the member and corresponding in number to the respective holders, together with fixedly located means adapted for releasable engagement with a removable element for interrupting the rotation of said member in the selection of a holder, means movable with the said revolvable member for releasing the said engagement, additional fixedly located means for engaging a selected holder to tilt the same into operative position and to return said holder to the inoperative position, to center the holder with reference to the projection means, and to swing said shutter out of and into light-intercepting position, and actuating means movable with the revolvable member for controlling the action of said additional fixedly located means.

4. In projection mechanism for consecutively exhibiting matter depicted on a plurality of slides and including means for projecting a light beam through a selected slide and a shutter for intercepting the light beam projected by the said means: of a revolvable member affording an assemblage of independent tiltable slide holders associated with the projection means, removable elements projecting from the member, together with fixedly located means adapted for releasable engagement with a removable element for interrupting the rotation of said member in the selection of a holder, means movable with the said revolvable member for releasing the said engagement, additional fixedly located means for engaging a selected holder to tilt the same into operative position and to return said holder to the inoperative position and including a pair of bell-cranks fixed with respect to the revolvable member, one arm of each crank bearing a cam, a roller movable with the revolvable member for periodically engaging with the respective cams, a pivoted member fixed with respect to said revolvable member for centering a tilted holder, together with mechanism intermediate the respective bell-cranks and the two fixedly located means and the pivoted member and the shutter to transmit motion therebetween.

5. In projection mechanism for consecutively exhibiting matter depicted on a plurality of slides and including means for projecting a light beam through a selected slide and a shutter for intercepting the light beam projected by the said means: of a revolvable member affording an assemblage of independent tiltable slide holders associated with the projection means, removable elements projecting from the member, a pair of bell-cranks fixed with respect to the revolvable member, one arm of each crank bearing a cam, a roller movable with the revolvable member for periodically engaging with the respective cams, bell-crank means fixed with respect to the said revolvable member for engaging the slide holders thereof, a pivoted member fixed with respect to said revolvable member for centering a tilted holder, together with mechanism intermediate the respective bell-cranks and the slide holder bell-crank means and the pivoted member and the shutter to transmit motion therebetween.

6. In projection mechanism of the nature set forth, the sub-combination of a revolvable member affording an assemblage of independent slide holders, including a circular carrier element having radial slots directed inwardly from its circumference and a circular groove in its upper surface interrupted at said slots, with a wire passing through a perforation in each of the respective holders to retain them pivotally in a corresponding slot, together with means to secure the wire to said carrier.

7. In projection mechanism of the nature set forth, the sub-combination of a rotatably mounted support and means to drive the same continuously, with a carrier element resting thereon for rotation thereby through frictional contact therebetween, and a plurality of slide holders pivotally mounted on the carrier to tilt over the edge of the same to a substantially horizontal position, together with means to engage temporarily the said carrier to arrest its rotational movement for positioning a selected holder.

8. In projection mechanism of the nature set forth, the sub-combination of a rotatably mounted support and means to drive the same continuously, with a carrier element resting thereon for rotation thereby through frictional contact therebetween, a plurality of slide holders pivotally mounted on the carrier to tilt over the edge of the same to a substantially horizontal position, together with means to engage temporarily the said carrier to arrest its rotational movement for positioning a selected holder, and means travelling with the support for releasing the engaging means.

9. In projection mechanism of the nature set forth, the sub-combination of a rotatably mounted support and means to drive the same continuously, with a carrier element resting thereon for rotation thereby through frictional contact therebetween, said carrier having removable stop elements extending therefrom, and a plurality of slide holders pivotally mounted on the carrier to tilt over the edge of the same to a substantially horizontal position, pivoted latch means fixed with respect to the carrier to engage a stop element thereof, together with means rotatable with the support to engage temporarily the said latch means.

10. In projection mechanism for consecutively exhibiting matter depicted on a plurality of slides: the combination with fixed projection means; of a revolvable member affording an assemblage of independent slide holders associated with the projection means, a continuously rotating support for the said member, stop elements corresponding in number to the respective holders, adapted for rotation with the revolvable member and for radial positioning relatively to said holders, together with fixedly located means adapted for releasable engagement with a stop element, when the latter is radially extended to engage therewith, for interrupting the rotation of said revolvable member in the selection of a holder, said stop elements when withdrawn radially from engaging position eliminating said interruption of rotation, and means movable with the said continuously rotating support for releasing said stop element engagements.

WALTER E. SCHWANHAUSSER.